April 20, 1971  J. R. HANNUM  3,575,768
MACHINE FOR MAKING CORRUGATED FIBRE
Filed April 1, 1968  3 Sheets-Sheet 1

INVENTOR.
JOSEPH R. HANNUM
BY *Edward M. Farrell*
ATTORNEY

United States Patent Office 3,575,768
Patented Apr. 20, 1971

3,575,768
MACHINE FOR MAKING CORRUGATED FIBRE
Joseph R. Hannum, Norristown, Pa., assignor to The
Budd Company, Philadelphia, Pa.
Filed Apr. 1, 1968, Ser. No. 717,622
Int. Cl. B31f 1/22
U.S. Cl. 156—459
7 Claims

ABSTRACT OF THE DISCLOSURE

An article of manufacture comprises a strip of corrugated fibre with the corrugations being substantially square and being formed against the grains which run lengthwise in the fibre. Means and methods for making such corrugated fibre are also provided.

---

Figure 1:
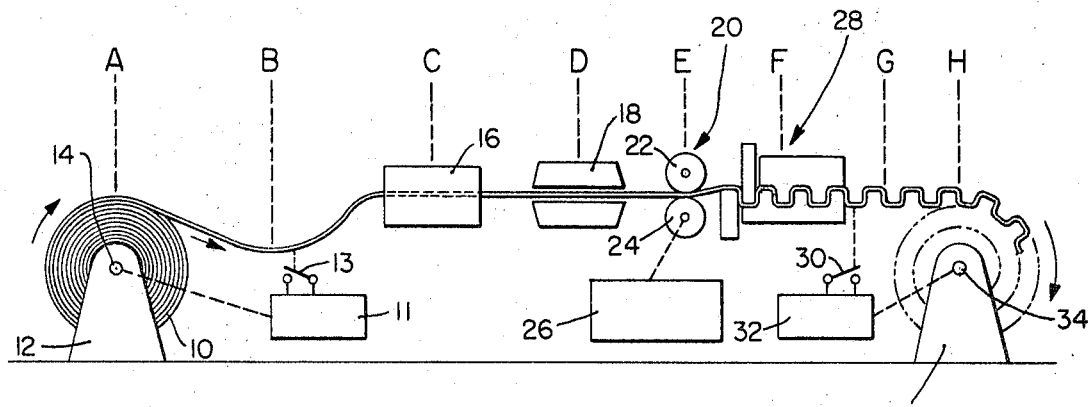

Vulcanized fibre has certain characteristics which make it ideally suited for many applications. Vulcanized fibre is manufactured from various types of cellulosic fibres, for example, high alpha cellulose from wood, pulps or cotton. The first step in the manufacture of such fibre generally involves forming a sheet of paper. A ply of the paper or a plurality of the plies of the paper, depending on the desired thickness of the final ply of vulcanized fibre, is generally saturated with hydroxilizing agent, such as concentrated zinc chloride. The hydroxilizing agent is permitted to react on the cellulosic fibres for a predetermined time at a controlled temperature. The hydroxilizing agent is removed from the paper in a series of leaching steps, referred to as puring. The vulcanized fibre is then dried. The vulcanized fibre may then be formed into various shapes and forms.

It is known that when paper is manufactured, that grains are formed in the paper in accordance with the direction of movement of the paper during manufacture. These directions or grains are also found in the paper used to make vulcanized fibre.

Vulcanized fibre is an especially durable and strong material. Because of this, it is often difficult to form or bend it without special treatment. This is especially true if the fibre is to be bent or formed against the grain.

Corrugated vulcanized fibre is useful in many applications including, for example, electrical transformers. In such transformers and the like, cooling fluid is used to pass through the corrugations of the fibre to cool the coils of the transformer. In general, when corrugated fibre is used in electrical transformers and other installations, it is subjected to high compressive forces which have a tendency to crush the corrugated fibre. It is therefore desirable to have the corrugated fibre highly resistant to the crush pressure to which it is subjected.

Heretofore corrugated fibre has generally been made in predetermined lengths. However, corrugated fiber has also been made in continuous strips with such corrugations generall being formed in the same direction as the grains of the fibre. It has been found that the crush strength of fibre formed with the corrugations with the grain is much less than when corrugated fibre is formed against the grain. Heretofore, corrguated fibre has not been generally made in continuous lengths with the corrugations against the grain. If the same type of machine presently used to form corrugated fibre with the grain were to be used to make corrugated fibre against the grain, problems would be presented because of the toughness of the material involved.

Because of the relative toughness of the fibre, it tends to maintain its original shape and spring back to its original form if it is bent. This tendency is especially pronounced if the fibre is bent against the grain.

It is an object of this invention to provide improved corrugated fibre, together with methods and means for making such fibre in which the corrugated fibre is formed against the grain.

It is a further object of this invention to provide an improved means wherein corrugated fibre is produced without straining or stretching the fibre when the corrugations are formed.

It is still a further object of this invention to provide improved means for maintaining corrugated fibre in its bent condition after it has been formed.

It is a further object of this invention to provide an improved corrugated fibre, together with method and means for making such fibre, which may be made in continuous lengths.

It is still a further object of this invention to provide improved corrugated fibre having improved crush strength when subjected to pressures in different directions.

It is still a futher object of this invention to provide novel machines and methods for making such improved corrugated fibre.

It is still a further object of this invention to provide improved corrugated fibre, together with method and means for making such fibre, which may be manufactured in continuous lengths.

In accordance with the present invention, an article of manufacture comprises a strip of fibre having grains running lengthwise therein. The strip of fibre includes substantially square corrugations therein with the direction of the corrugations being substantially perpendicular to the direction of the grains of the fibre. A novel machine is employed to make the square corrugations in the fibre. The method of making the fibre includes various means including heating the fibre material before and during the process of forming the fibre. Additional means are provided to keep the fibre from returning to its original shape after it has been corrugated.

Figure 2:
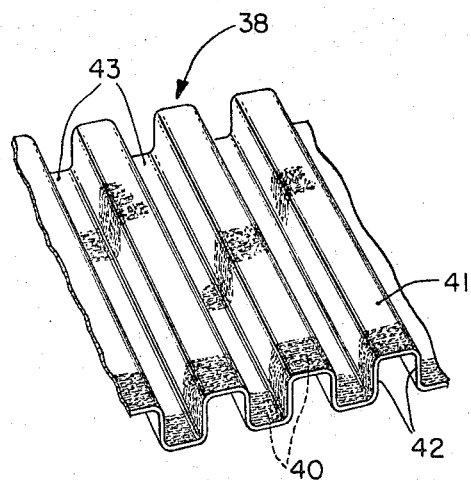
Figure 3A:
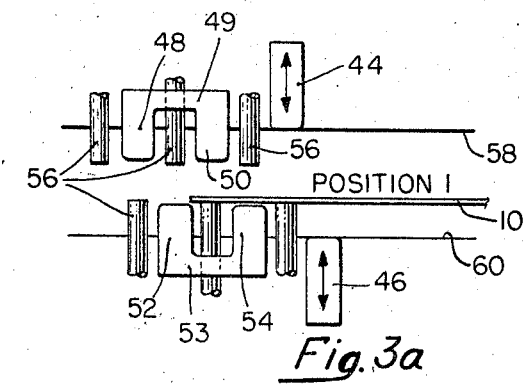
Figure 3E:
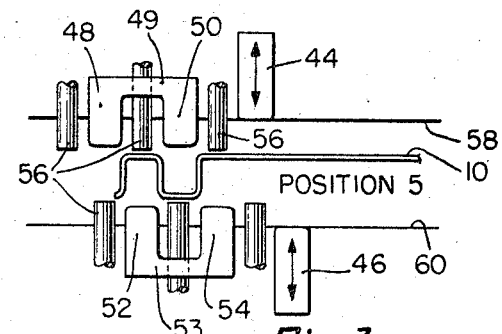
Figure 3B:
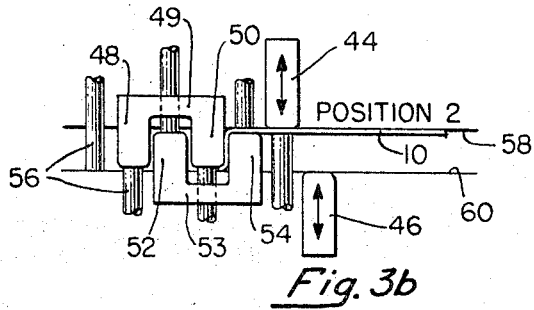
Figure 3F:
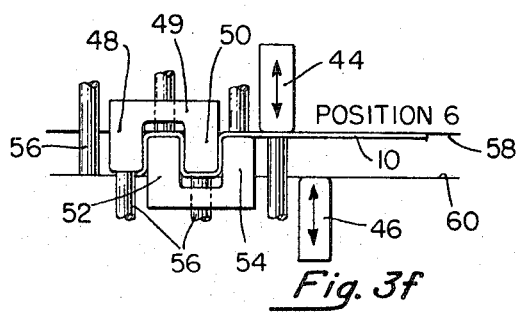
Figure 3C:
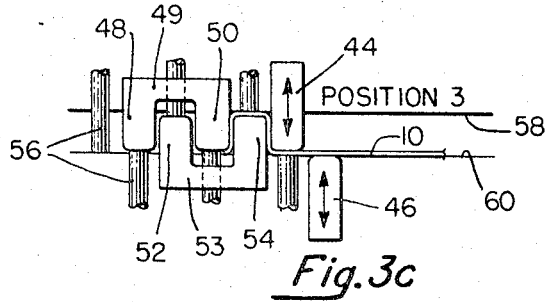
Figure 3G:
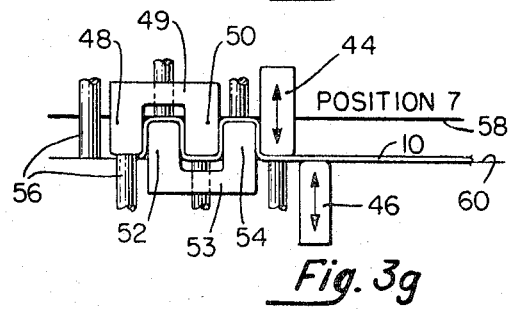
Figure 3D:
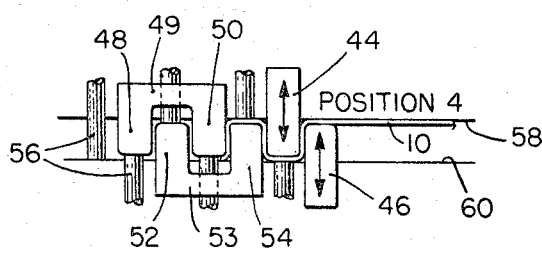
Figure 3H:
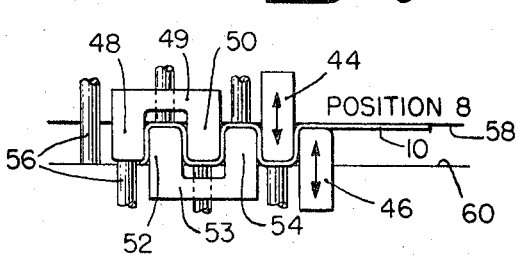
Figure 4:
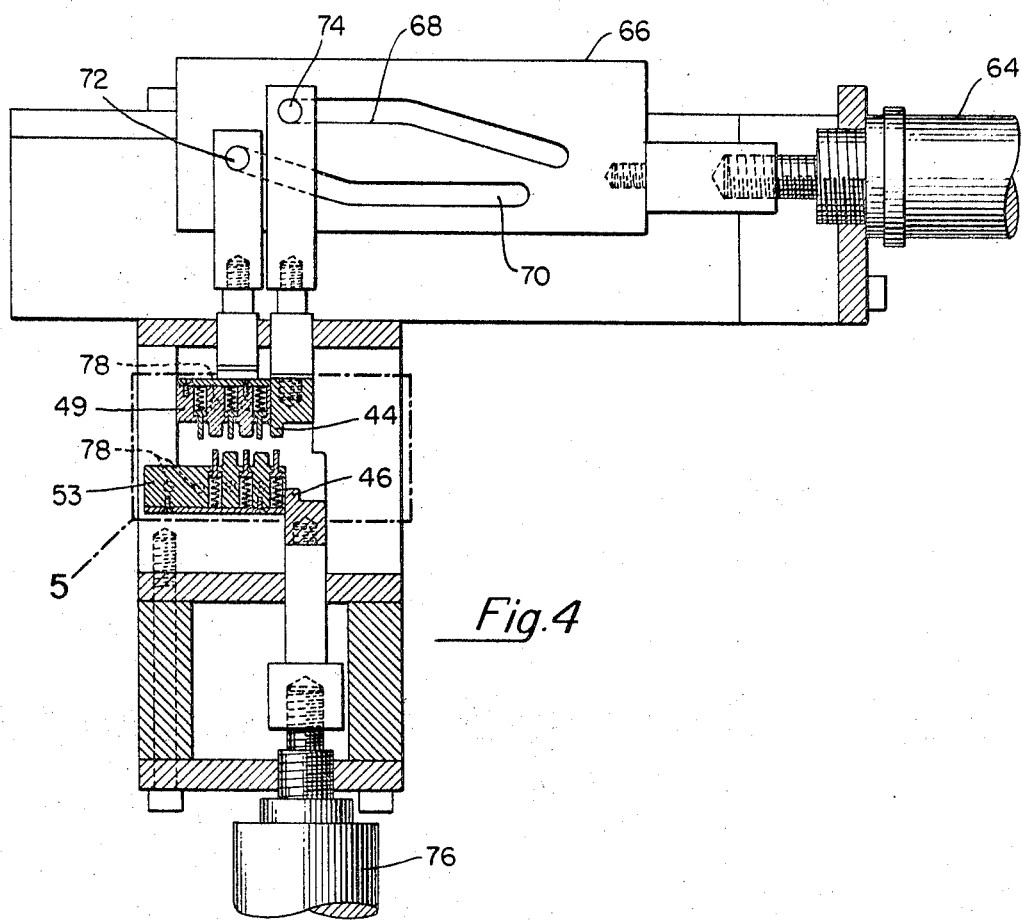
Figure 5:
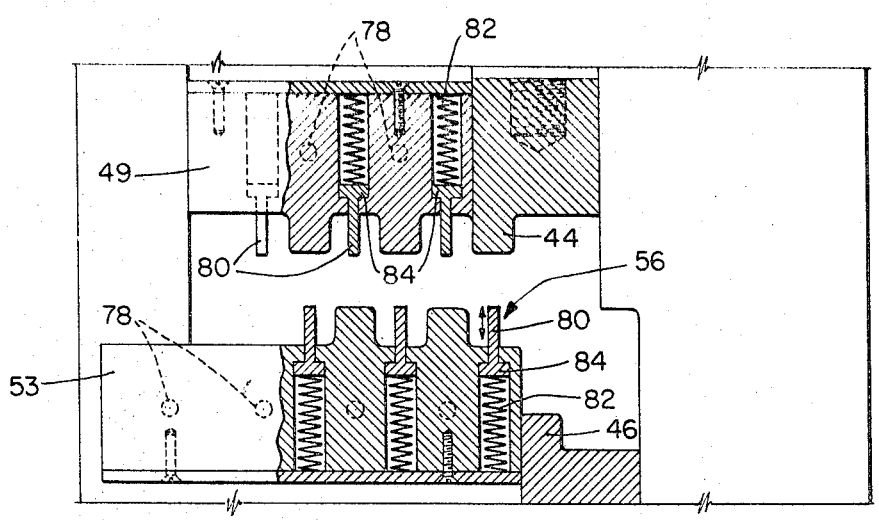

Other objects and advantages of the present invention will be apparent and suggest themselves to those skilled in the art, from a reading of the following specification and claims, in conjunction with the accompanying drawings, in which:

FIG. 1 is a representation illustrating the various steps employed in making the corrugated fibre, in accordance with the present invention, FIG. 2 illustrates a strip of corrugated fibre made in accordance with the present invention, FIGS. 3a, 3b, 3c, 3d, 3e, 3f, 3g and 3h illustrate various steps in a method for forming the corrugations in fibre, in accordance with the present invention, FIG. 4 illustrates a machine which may be employed in making corrugated fibre, in accordance with the present invention, and FIG. 5 is a diagram, partly in cross section, illustrating an arrangement for a spring element, in accordance with the present invention.

Referring particularly to FIG. 1, a roll of fibre 10 is illustrated at position A on a support 12 prior to being corrugated. In operation, a mechanical drive or motor 11 may normally be selectively connected to a shaft 14 in the center of the rolled fibre 10. This driving means acts as a coarse feed and is normally energized by a mercury switch 13 disposed at position B.

When the fibre 10 unrolls and is between positions A and C, the tension in the fibre is sufficiently tight so as to energize the mercury switch 13 at position B. Such means are well known to those skilled in the art. For purposes of clarity and because such means are only indirectly related to the present invention, a detailed showing or description of such loop control means will not be made, suffice to say that loop control means have been used in many applications in the past, including tape transport systems in computer systems.

The fibre 10 passes from position B to position C. A steam or hot water chest 16 is provided at position C to receive the fibre 10. The amount of steam or hot water to which the fibre is subjected may be controlled in accordance with the thickness of the fibre and other factors. In some cases, if the fibre is relatively thin, it may be desirable to pass the fibre through the chest 16 without subjecting it to any steam or hot water.

The fibre 10 is passed from position C from the hot water chest 16 to the position D. A preheater 18 is provided at this point to receive the fibre 10. The temperature to which the fibre 10 is preheated at this point may be completely controllable. In some cases involving relatively thin fibre, the fibre 10 may pass through the preheat plates of the preheater 18 without being preheated.

The fibre 10 is then passed from position D to position E. A fine mechanical feed control 20 is provided at position E. The feed control 20 accurately supplies fibre to the forming die 28 as required at a controlled rate. In the embodiment illustrated, the feed control 20 comprises a pair of rollers 22 and 24. The roller 24 may be intermittently driven by control means 26 which may include various microswitches and other circuitry. In general, the roller 24 may be activated by a microswitch or other means which may be mechanically actuated by means associated with the forming die 28 at the end of each complete cycle of corrugation after the die elements are separated, as will be described. Means for energizing and intermittent stepping of elements at the end of a cycle of operation are well known. Because such means are only incidentally related to the present invention, a detailed showing and description of such means is not presented.

The fibre 10 is then removed from position E to position F. At position F, there is a three-step progressive forming die 28 which is used to form the square corrugated fibre. This die will be described in greater detail in conection with FIGS. 3, 4 and 5. After leaving the die 28, the fibre is removed to positions G and H.

A mercury switch 30 may be disposed at position G and adapted to become actuated when the fibre between positions F and H becomes sufficiently tight. The closing of the microswitch 30 controls circuitry in the control means 32 which in turn drives a shaft 34, which is mounted on a pick-up support stand 36, causing the formed corrugated fibre to be rolled. If desired, a shear could be added and formed fibre could by-pass the wind-up stand 34 at H, with sheets being cut to any desired length rather than have the fibre rolled into continuous strips as illustrated.

Referring particularly to FIG. 2 there is illustrated a piece of corrugated fibre 38. The corrugated fibre 38 includes grains 40 running lengthwise therethrough. The corrugations are substantially perpendicular to the direction of the grains. The corrugations are substantially square and not curved in a manner found in many conventional corrugated fibres.

The substantially square corrugations in the fibre 38 provides improved crush strength of the fibre. For example, if pressure is exerted downward on the top portion 41 of the fibre, the pressure will be exerted downward against the side walls 42. Because the side walls 42 are substantially parallel to the direction of the pressure, the walls will be able to withstand a much greater pressure than if the walls were curved or sinusoidal. The fact that the corrugations are formed against the grain of the fibre rather than with the grain also adds to the crush strength of the fibre.

It is noted that if the corrugations are formed with the grain, it may be easier to form the corrugations. However, the resulting product would not be as strong as the corrugated fibre illustrated in FIG. 2. In most conventional machines used heretofore, if any attempt was made to form the corrugations against the grain there would be limitations in the width of the fibre which could be made. For example, it would take an infinitely wide machine to produce a continuous strip of fibre of square fibre if an attempt were made to use the same conventional type machine.

Referring particularly to FIG. 3, eight positions of the fibre 10 as it passes through the forming die are illustrated. It will be assumed that the fibre is passing from right to left. For purposes of illustration, the relatively wide projecting elements may be considered as the forming dies. The relatively narrow elements may be considered at compressible elements for ejecting the fibre 10 from between the main dies after the corrugations are formed and to maintain the fibre in the same plane as it is progressively moved.

In general, a pair of dies 44 and 46 are adapted to be independently operated up and down. In the embodiment illustrated, die unit 49 includes projecting die portions 48 and 50 designed to remain fixed with respect to each other. Likewise, bottom die unit 53 includes projecting die portions 52 and 54 in fixed relationship with respect to each other. The various spring elements 56 are designed to eject fibre from between the die portions and will move up or down depending upon the movement and position of its opposing die portions.

Prior to operation, the top die spring elements are disposed in the positions indicated with respect to a reference plane 58. Likewise the bottom die unit 53 and the bottom spring members are disposed in a plane represented by a reference plane 60.

In position 1, illustrated in FIG. 3a, the fibre 10 is inserted between the top and bottom die and spring members in the manner illustrated. The fibre 10 may be inserted automatically or manually.

Position 2, illustrated in FIG. 3b, illustrates the first step in the corrugating process. In this step, the die unit 49 is moved downwardly with the projecting elements 48 and 50 intermeshing with the projecting portions 52 and 54 of die unit 53. The die portion 50 bends the fibre 10 at substantially right angles in the manner illustrated.

Position 3, illustrated in FIG. 3c, illustrates the next step in the corrugating process. The die unit 49 is maintained in a down position and the die 44 is then moved downwardly. This causes the fibre to be bent at a right angle in a reverse direction to the first bend illustrated in position 2. This results in two parallel side surfaces in the fibre connected by a top surface perpendicular thereto.

In position 4, illustrated in FIG. 3d, the die unit 49 is maintained in a down position along with the movable die 44. The movable die 46 is then moved upwardly to cause another fold in the corrugated fibre at right angles in the manner illustrated. This results in three side parallel surfaces in the fibre connected by surfaces perpendicular thereto. At this point, one complete cycle of operation has been completed. The type of fibre produced is illustrated in FIG. 2.

After the first complete cycle of operation, the fibre 10 is moved to the left so as to permit the next corrugated section to be formed. The fibre 10 is moved a predetermined distance to permit the next operation to take place. The discrete movement of the fibre 10 may be controlled by various control means including microswitches as discussed in connection with the mechanical feed control means 20 of FIG. 1. The upper die and spring elements are moved upwardly to their original positions prior to each movement of the fibre 10 in discrete steps.

Position 5, illustrated in FIG. 3e, illustrates the position of the fibre 10 at the start of the next operating cycle. At this point, fibre 10 has been moved to the left a distance equal to two corrugations in the fibre, in the manner described. Position 5 is the same as position 1 except that the fibre has been advanced.

It is noted in position 5, as in position 1, that the projecting die portions of the die units 49 and 53 and the surfaces of the spring elements 56 are all in substantially the same plane. This arrangement facilitates the advance of the fibre. It is further noted that the spring elements 56 are used to eject the fibre from between the die portions prior to advancing the fibre.

Position 6, illustrated in FIG. 3f, is substantially the same as position 2 except that the corrugations already in the fibre 10 are accommodated by the projecting die elements of the die units 49 and 53, the dies and their associated opposed biasing elements 56. The die units 49 and 53 accommodate the fibre 10 and may be considered as secondary dies which keep the fibre under heat and pressure to keep the fibre in shape after it has been formed.

In position 7, illustrated in FIG. 3g, the die 44 is moved to a downward position to fold the fibre at right angles to the direction of movement in the manner as illustrated.

In position 8, illustrated in FIG. 3h, the die 46 is moved to an upward position in the manner illustrated causing the fibre to be folded at right angles to the direction of movement. This completes another cycle of operation in forming the corrugated fibre.

In considering the operation described, the dies 44 and 46 may be considered as the forming dies. The die elements 49 and 53 may be considered as the secondary dies. These latter die units may include more than two projecting die portions. They may include four, six or any desired number. The die units 49 and 53 may include heating elements 78 for maintaining the formed fibre in a heated condition under pressure for a predetermined period of time. Keeping the fibre under heat and pressure for a predetermined time prevents the fibre from returning to its original shape, in a sense destroying its memory.

Following position 8, the die members are separated to permit the fibre 10 to be intermittently moved and the next cycle of operation to take place. This operation is repeated indefinitely thereby permitting the fibre to be continuously corrugated as it moves through the die forming mechanism.

An important feature of the present invention is that the corrugated fibre is formed by making one fold at a time. This prevents the fibre from being stretched during the operation. Also, the tendency of the fibre to crack at the corners is minimized because of the arrangement involving forming the corrugated fibre one fold at a time.

Referring particularly to FIG. 4 a working embodiment of one type of machine for making the square corrugated fibre previously described is illustrated. The die arrangement is substantially similar in operation to that illustrated in FIG. 3. The top die units 49 and the die member 44 are adapted to be selectively moved up and down. A top die 49 including a plurality of projecting members to receive the fibre after it has been corrugated. The bottom die unit 53 is adapted to be maintained stationary and also includes projecting portion to receive the formed fibre.

A source of pressure is connected to a conduit 64 which is adapted to move a frame element 66 when pressure is applied thereto. The application or non-application of fluid pressure may be dependent upon the operation of a solenoid valve for example. This solenoid valve may be controlled by control means 11 in association with a microswitch 13 (FIG. 1), for example.

The frame member 66 includes a pair of slots 68 and 70 adapted to receive pin elements 72 and 74 respectively. As the frame element 66 moves forward because of the application of pressure to the conduit 64, the pin elements 72 and 74 ride in the elongated slots 68 and 70 respectively. The slots 68 and 70 may be considered as camming means for directing the direction of movement of the pins 72 and 74.

As the pin 72 is forced downward, the top die unit 49 is forced downward. This provides the holding action for the fibre as it is inserted between the die members 49 and 53. The pin 74 continues in a relatively straight line in the slot 68 while the pin 72 is being moved downward.

After the pin 72 is completely downward, it starts to move in a straight line within the slot 70. This holds the die member 60 in a down position. While the die member 60 is being held downward, the pin 74 following the slot 68 eventually starts to move downward. This causes the die 44 to move downward causing the fibre to be bent in the manner previously described.

At a selected time, fluid pressure is applied to a second conduit 76. Fluid is applied to this conduit 76 and may be dependent upon the operation of a solenoid valve, which may in turn be actuated by suitable switching means. When pressure is applied through the conduit 76, the die 46 is forced to be moved upwardly thereby causing the inserted fibre to be folded in the manner previously described.

The mechanical connection involving the various pistons which may be associated with the conduits 64 and 76 are standard items well known to those skilled in the art. Therefore, they will not be shown or described in detail since they are only incidentally related to the subject invention.

The sequence of operations of the various dies illustrated may of course be controlled by different means than those illustrated. For example, other than fluid pressure means may be employed to actuate the various dies. These means may include straight mechanical or electrical means.

It is noted that the projecting portions of the die units 49 and 53, as well as the dies 44 and 46 are substantially square in shape. This shape permits the square corrugation to be formed in the fibre. It is noted that these projecting portions may be different sizes to accommodate different sizes of corrugated fibre to be formed. The spacing between the dies during operation may also be controlled in accordance with the fibre thickness involved.

In some cases, especially in cases of fibre which is relativley thick, it is relatively difficult to fold the fibre without taking some additional steps. For example, as illustrated the present invention has provided means for pre-moistening and preheating the particular fibre. If this is not done in some cases and the fibre is too dry or too thick it will tend to crack during the folding operation.

In order to prevent the formed fibre from springing back to its original shape a plurality of heating elements 78 may be included in the top and bottom die units 49 and 53. As mentioned, the die units 49 and 53 may be much longer than that illustrated and include more projecting portions.

It was mentioned that the spring members 56 are included to eject the formed fibre from between the projecting die portions of the dies. Also, they serve to provide a level plane on which the formed fibre may ride as it moves through the machine. This minimizes the likelihood of the fibre being jammed between parts in the machine during operation.

FIG. 5 illustrates a spring element arrangement as previously discussed. This spring member 56 comprises a pin 80 adapted to be maintained under tension by a spring 82. When pressure is exerted against the pin, a piston like element 84 is forced downward (or upward depending on the location of the pin) against the spring 82 to overcome its bias. All of the spring elements 56 previously referred to may operate in substantially the same manner.

It has been mentioned that the square corrugated fibre made in accordance with the subject invention has improved crush strength over conventional fibre. This crush strength is also evident if the fibre is wound around an installation, for example, with pressures being exerted downward against the edges of the fibre.

The present invention has been described in connection with fibre because fibre was the material used in a working embodiment built by applicant. It is likely that, in many cases, the subject invention could be used in forming corrugations in other types of material.

What is claimed is:

1. A machine for making square corrugated fibre from a sheet of fibre having a main flat surface comprising first and second forming die means disposed to receive a sheet of fibre therebetween, means for moving said first forming die means in a vertical direction to form a first bend in said fibre at a substantially right angle to the main flat surface of said sheet of fibre, means for moving said second forming die means vertically in a direction opposite to the direction of movement of said first die forming means to bend said fibre at a substantially right angle to said main flat surface of said fibre to form a second bend in an opposite direction to said first bend to form square corrugated fibre, said first and second forming die means being moved sequentially and independent of each other, means for moving said fibre in increments to move said corrugated portions of fibre past first and second forming die means and to move another portion of said fibre between said first and second forming die means, first and second secondary die means disposed to receive therebetween the corrugated portions of fibre after they have moved past said first and second forming die means when said first and second secondary die means are moved toward each other, said first and second secondary die means being shaped to fit into the corrugations formed in said fibre by said first and second forming die means, and means for selectively moving said first and second secondary die means wtih respect to each other to receive the corrugated portions of fibre therebetween.

2. A machine as set forth in claim 1 wherein said first and second secondary die means include a plurality of projecting die portions for post forming said corrugated fibre previously preformed by said forming die means.

3. The invention as set forth in claim 2 wherein heating means are associated with said secondary die means to cause the corrugated fibre to be subjected to heat and pressure to permanently form said corrugated fibre.

4. The invention as set forth in claim 3 wherein the projecting die portions of said secondary die means are substantially rectangular in shape to form substantially square corrugations in said fibre.

5. The invention as set forth in claim 4 wherein a plurality of spring elements are disposed between said projecting die portions to eject said fibre and to provide a plane surface at the same plane as said projecting die portions to permit said fibre to ride along a straight line during the incremental movements of said fibre.

6. A machine for making a square corrugated article from a flat piece comprising a first and second forming die means disposed to receive said flat piece therebetween, means for moving said first forming die means in a vertical direction to form a first bend in said flat piece at a substantially right angle to the main surface of said flat piece, means for moving said second forming die means vertically in a direction opposite to the direction of movement of said first forming die means to bend said flat piece at a substantially right angle to said flat piece to form a second bend in an opposite direction to said first bend to form a square corrugated article, said first and second forming die means being moved sequentially and independent of each other, means for moving said flat piece in increments to move said corrugated article past said first and second forming die means and to move another portion of said flat piece between said first and second forming die means, first and second secondary die means disposed to receive therebetween the corrugated portions of article after they have moved past said first and second forming die means, said first and second secondary die means being shaped to fit into the corrugations formed in said article by said first and second forming die means, and means for moving said first and second secondary die means with respect to each other to receive the corrugated portions of said article therebetween.

7. A machine as set forth in claim 6 wherein said first and second die forming means and said first and second secondary die means include projected die portions which are substantially rectangular in shape to form square corrugations in said article.

References Cited

UNITED STATES PATENTS

| 1,488,504 | 4/1924  | Keyes     | 156—459X |
| 2,851,979 | 1958    | Chatfield | 72—344   |
| 2,960,146 | 11/1960 | Williams  | 156—471X |

SAMUEL W. ENGLE, Primary Examiner

J. J. DEVITT, Assistant Examiner

U.S. Cl. X.R.

156—205